(12) United States Patent
Kim et al.

(10) Patent No.: US 12,280,366 B2
(45) Date of Patent: Apr. 22, 2025

(54) METHOD FOR COATING EXHAUST GAS PURIFICATION CATALYST FILTER WITH FIXED AMOUNT OF CATALYST SLURRY

(71) Applicant: HEESUNG CATALYSTS CORPORATION, Gyeonggi-do (KR)

(72) Inventors: Byung-suk Kim, Seoul (KR); Sang-yun Han, Gyeonggi-do (KR); Seung Chul Na, Seoul (KR)

(73) Assignee: HEESUNG CATALYSTS CORPORATION, Gyeonggi-do (KR)

( * ) Notice: Subject to any disclaimer, the term of this patent is extended or adjusted under 35 U.S.C. 154(b) by 775 days.

(21) Appl. No.: 17/601,242

(22) PCT Filed: Mar. 31, 2020

(86) PCT No.: PCT/KR2020/095057
§ 371 (c)(1),
(2) Date: Oct. 4, 2021

(87) PCT Pub. No.: WO2020/204683
PCT Pub. Date: Oct. 8, 2020

(65) Prior Publication Data
US 2022/0184594 A1   Jun. 16, 2022

(30) Foreign Application Priority Data

Apr. 5, 2019 (KR) ........................ 10-2019-0039880

(51) Int. Cl.
*B01J 37/02* (2006.01)
*B01D 53/94* (2006.01)
(Continued)

(52) U.S. Cl.
CPC .......... *B01J 37/0215* (2013.01); *B01D 53/94* (2013.01); *B01J 35/56* (2024.01); *F01N 3/022* (2013.01);
(Continued)

(58) Field of Classification Search
None
See application file for complete search history.

(56) References Cited

U.S. PATENT DOCUMENTS

| 4,609,563 A | 9/1986 | Shimrock et al. |
| 2014/0356530 A1* | 12/2014 | Roberts .................. B05C 11/02 427/238 |
| 2014/0363578 A1* | 12/2014 | Han ..................... B01J 37/0215 427/350 |

FOREIGN PATENT DOCUMENTS

| KR | 10-2013-0067640 A | 6/2013 |
| KR | 20130067640 A * | 6/2013 ........... B01D 53/944 |
| KR | 10-2018-0011649 A | 2/2018 |
| KR | 10-2002-0048386 A | 6/2022 |

OTHER PUBLICATIONS

Ha et al. KR20130067640A—translated document (Year: 2013).*
(Continued)

*Primary Examiner* — Jelitza M Perez
(74) *Attorney, Agent, or Firm* — Ballard Spahr LLP

(57) ABSTRACT

Described is a method of coating the inside of an exhaust gas purification catalyst filter with a predetermined amount of catalyst slurry while adjusting the distribution of catalyst components in or on a cell wall of the filter. A predetermined amount of catalyst slurry can be injected into an internal channel of a filter to solve conventional problems caused by excess or surplus slurry injection. The predetermined amount of slurry injected into the internal channel of the filter is coated on or in the cell wall, depending on the viscosity and particle size of the slurry. This enables a coating profile in which the slurry distribution at a front portion of the filter and the slurry distribution at a back portion of the filter differ from each other. In addition, the coating profile on the inner surface of the cell wall or in the pores of the cell wall can be adjusted through the subsequent air blowing, so that the back pressure of the filter and the (Continued)

performance of the catalyst filter, such as catalytic activity, can be improved. In addition, the coating length in the filter can be adjusted by controlling the pressure of air during the air blowing.

5 Claims, 7 Drawing Sheets

(51) Int. Cl.
  *B01J 35/56* (2024.01)
  *F01N 3/022* (2006.01)
  *F01N 3/035* (2006.01)
  *F01N 3/28* (2006.01)
(52) U.S. Cl.
  CPC ........... *F01N 3/035* (2013.01); *F01N 3/2803* (2013.01); *B01D 2255/915* (2013.01); *F01N 2510/00* (2013.01); *F01N 2510/068* (2013.01)

(56) References Cited

OTHER PUBLICATIONS

International Search Report mailed on Jul. 21, 2020 by the International Searching Authority for International Application No. PCT/KR2020/095057, filed on Mar. 31, 2020 and published as WO2020204683A1 on Oct. 8, 2020 (Applicant—Heesung Catalyst Co., Ltd.) (18 Pages).

\* cited by examiner

METHOD FOR COATING EXHAUST GAS PURIFICATION CATALYST FILTER WITH FIXED AMOUNT OF CATALYST SLURRY

CROSS-REFERENCE TO RELATED APPLICATIONS

This application is a U.S. National Phase Application of International Application No. PCT/KR2020/095057, filed Mar. 31, 2020, which claims priority to Korean Application No. 10-2019-0039880, filed Apr. 5, 2019, each of which are hereby incorporated by reference in their entirety.

TECHNICAL FIELD

The present invention relates to a method of coating the inside of an exhaust gas purification catalyst filter with a predetermined amount of catalyst slurry. More specifically, the present invention relates to a method of controlling the distribution of catalyst formed in a wall or on the wall of each of the filter cells constituting an exhaust gas purification catalyst filter while coating the inside of the filter with a predetermined amount of catalyst slurry.

BACKGROUND ART

An exhaust gas purification catalyst filter is based on a filter technology in which particulate materials discharged from an internal combustion engine are collected by a filter, the filter is regenerated by burning the collected particulate materials, particulate materials in exhaust gas are collected again by the regenerated filter. In this way, the filter is reused many times. As the filter, a catalyzed soot filter (CSF) with an oxidation catalyst coating on the surface thereof may be used. Such an exhaust gas purification catalyst filter effectively removes not only particulate matter but also HC, CO, and NOx contained in exhaust gas. The exhaust gas purification catalyst filter is a porous silicon carbide sintered body, which is a type of ceramic sintered body, or a honeycomb structure formed of cordierite, aluminum titania, etc. A catalytic material is formed as a coating layer on the wall surface of each filter cell or in the pores formed in the filter cell wall. Korean Patent No. 10-2005-0034983 discloses a dipping technique as a method of fixing a catalytic material to a filter. In the method, a catalyst slurry composed of particles of a catalyst component is first prepared, and a filter is immersed in the catalyst slurry to obtain a catalyst filter for a diesel engine. However, with this dipping method, it was difficult to meet various requirements for catalytic filters, including satisfaction to exhaust gas regulations, control and reproducibility for the accurate amount of coated slurry, which are required to maintain catalytic activity, and control of slurry distribution on the wall of a filter cell. In addition, there is a problem in that in some cases, the dipping method cannot be used depending on the porosity of filters. On the other hand, Korean Patent 10-1271434 discloses a so-called push-and-pull (PnP) method as a fixed-amount coating method. However, this method is a coating method applicable to a catalytic converter that is structurally different from a filter. Unlike a filter structure, a converter having an open channel does not have a restriction on the back-pressure. Therefore, there is no need to change the profile of the coating formed on the inner wall surface of a filter cell. That is, there is no need to control the distribution of slurry on the inner wall surface of a filter cell.

DISCLOSURE

Technical Problem

An objective of the present invention is to provide a fixed-amount slurry coating method for an exhaust gas purification filter. Another objective of the present invention is to provide a method of coating a predetermined amount of catalyst slurry without depending on the porosity of a filter. Typically, 40% or more of porosity is required for filters. A further objective of the present invention is to provide a method of controlling the distribution of catalyst slurry to be uniform inside or on the wall surface of each of filter cells. A yet further objective of the present invention is to provide a method of coating the inside or an inner wall surface of a filter cell with a catalyst slurry by controlling slurry properties.

Technical Solution

The present invention proposes a method for coating an exhaust gas purification filter with a predetermined amount of catalyst slurry. The method includes a step of injecting a predetermined amount of catalyst slurry into a catalyst filter, thereby enabling a new coating profile. The method further includes a step of blowing air into the catalyst filter from an end of the catalyst filter to control the slurry distribution on the inner wall surface of the catalyst filter. The present invention includes, but is not limited to, the following features. In the step of injecting a predetermined amount of catalyst slurry into a filter, a so-called PnP method disclosed in Korean Patent 10-1271434 is used. Specifically, the method includes: a step of introducing the catalyst slurry into a volume-defined container with a vertically movable bottom; moving the volume-defined container to a lower portion of the catalyst filter such that a lower end of the catalyst filter and an upper end of the volume-defined container are horizontal; sealing the lower end of the catalyst filter and the upper end of the volume-defined container so as to be isolated from the outside; moving the bottom of the volume-defined container upward; applying a vacuum pressure while cancelling the sealing; and moving the volume-defined container downward. In the present invention, the catalyst slurry injected into the filter has an appropriate viscosity and particle size so as to pass through pores formed in the filter cell wall, whereby the slurry coating profile formed on the inner wall surface of each filter cell can be controlled. The catalyst slurry may have a viscosity and a particle size such that the catalyst slurry cannot pass through the pores formed in the filter cell wall. Thus, the slurry may be coated on the inner wall surface of each filter cell. In the present invention, the pressure of air jetted into the catalyst filter in the same direction as the slurry feed direction may be adjusted to control the distribution of the catalyst slurry so that the catalyst slurry can be uniformly distributed on the inner wall surface of the filter cells.

Advantageous Effects

With the use of the catalyst slurry coating method for an exhaust gas purification filter, according to the best mode of the present invention, the desired amount of catalyst slurry can be injected into the internal channel of the filter, thereby solving the problems caused by excessive or surplus slurry coating which frequently occurred by conventional coating methods. When the desired amount of catalyst slurry is injected into the filter channel, the injected catalyst slurry can be uniformly coated on the inner wall surface of each of the filter cells due to the appropriate viscosity and particle size of the catalyst slurry, and the profile of the slurry coating formed in the filter channel or on the inner wall surface of the filter cell is changed by the subsequent air injection. Therefore, the catalyst performance such as backpressure and catalytic activity can be improved. In addition, the length of the slurry coating formed in the filter can be adjusted by controlling the pressure of air jetted into the filter channel.

DESCRIPTION OF DRAWINGS

The drawings are provided to help description of embodiments of the present invention and are not intended to limit the scope of the inventions defined by the claims.

BEST MODE

Definition

In the present invention, the term "predetermined amount" means a precisely controlled target amount of catalyst slurry by which a plurality of channels or cells can be substantially completely coated. The term "substantially completely coated" herein means that only 1% or less of the metered catalyst slurry is not coated or loaded but is discharged from the filter channels. In the description of the present invention, the term "cross-section" is defined as a cross section taken along a direction perpendicular to the flow direction of exhaust gas, unless otherwise specified. On the other hand, the term "second half" or "outlet" may be understood as a side through which exhaust gas is discharged to the outside from the filter, and the term "first half" or "inlet side" is defined as a side through which exhaust gas discharged from the engine flows is introduced into the filter. In addition, "first half" and "second half" are not necessarily terms that divide the filter in the longitudinal direction and may be understood as a part of the first half and a part of the second half depending on exhaust gas and engine conditions. In the present invention, the exhaust gas refers to a comprehensive concept containing harmful components, including exhaust gas generated from a mobile internal combustion engine such as an automobile or a stationary internal combustion engine such as a power plant.

The present invention primarily proposes a predetermined-amount coating method for a catalyst filter. The coating method, according to the present invention applies the PnP coating method that has been used for a conventional monolithic catalytic converter to a filter structure. The present invention also provides a method of controlling the distribution of catalyst slurry inside or on the wall surface of a filter cell and to provide a method of coating the inside or on the cell wall of a filter cell with slurry according to the slurry properties.

Figure 1:
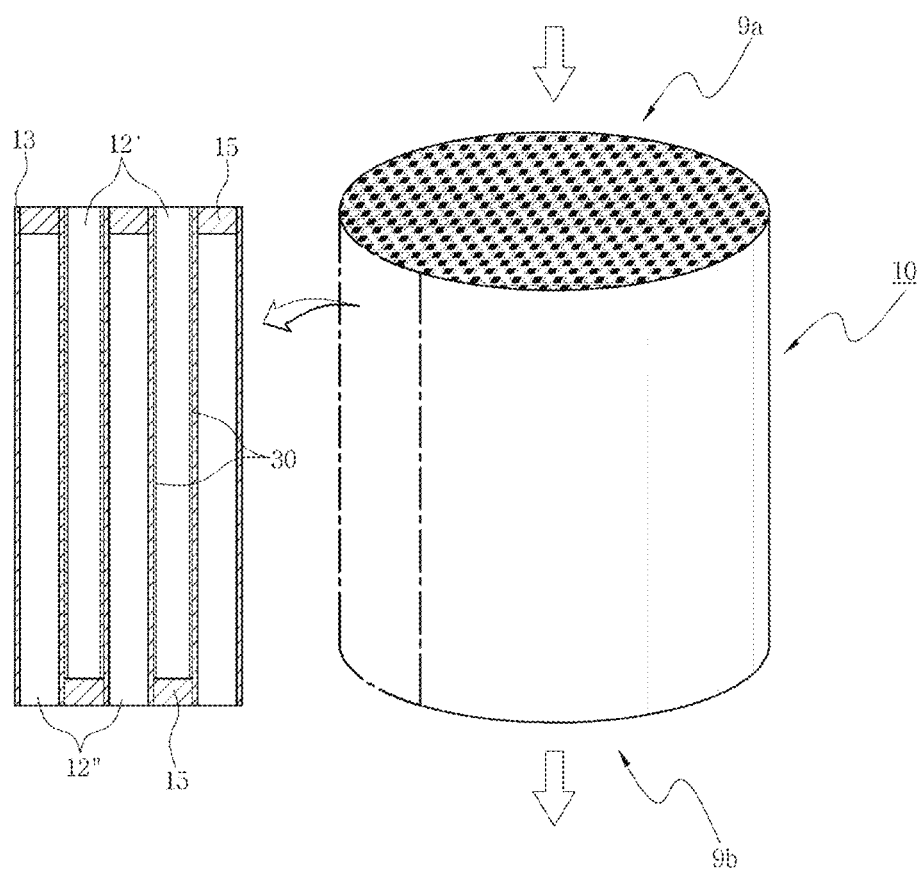
FIG. 1 is a schematic perspective view and a partially enlarged cross-sectional view of a catalyst filter.

Hereinafter, a catalyst filter coating method according to the present invention will be described with reference to the drawings, but the present invention is not limited to the embodiments. First, a filter structure will be described. FIG. 1 is a perspective view and a partially enlarged cross-sectional view of a cylindrical catalyst filter. In the structure of the honeycomb filter 10, a plurality of through-cells (or called channels) 12' and 12" having a substantially square cross section are regularly formed along the axial direction. Each of the through-cells 12' and 12" is partitioned by thin cell walls 13 to be separated from each other. About half of the plurality of cells are open at the inlet end face 9a, and the remaining cells are open at the outlet end face 9b. A catalyst material 30 made of platinum or other metals and oxides of platinum or other metals is coated or supported on the surface of the cell walls 13 or in the pores formed in the cell walls 13 of the cells 12' that are open at the inlet end face 9a. The opening (formed at the end face 9a or 9b) of each of the through-cells 12' and 12" is plugged to be sealed. Therefore, the entire cross section of the filter structure has a checkerboard shape. The density is set to around 200 pieces/inch$^2$, and the thickness of the cell wall 13 is set to around 0.3 mm.

Figure 2A:
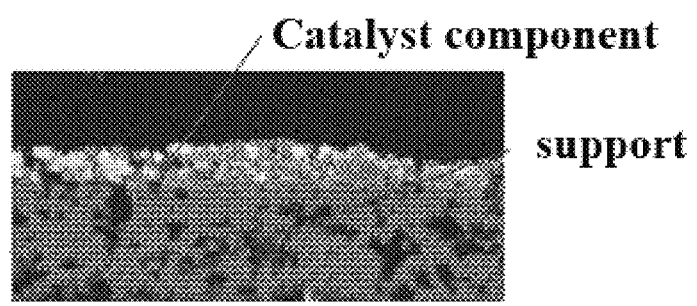
FIG. 2A is a scanning electron microscope (SEM) image showing the components of a catalyst coated on the well surface of a filter.
Figure 2B:
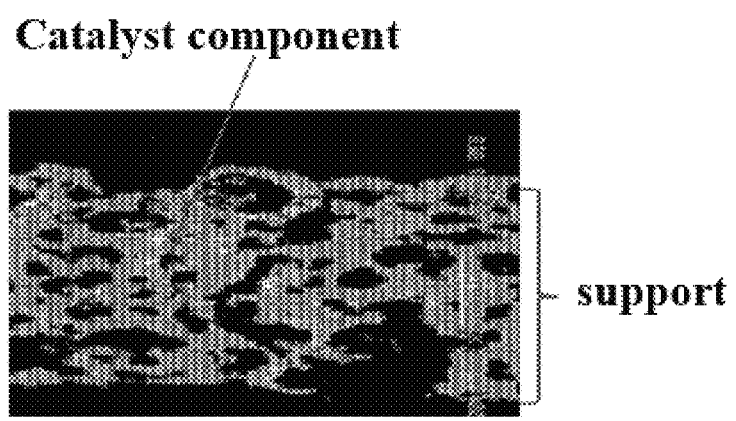
FIG. 2B is a SEM image showing a catalyst material formed on the inner wall surface of a filter cell.

The exhaust gas entering the cell 12' being open at the inlet end face 9a passes through the cell wall. At this time, the particulate material is filtered out (i.e., trapped and deposited) and only the remaining gas component is discharged to the outside through the cell 12" being open at the outlet end face 9b by passing through the pores of the cell walls. While the exhaust gas passes through the cells 12' and 12", the oxidation and reduction reactions of the gas components are promoted by the catalyst coated on the cell wall 13 (FIG. 2A) or supported in the pores formed in the cell wall (FIG. 2B), whereby the gas components are converted into unharmful substances. These unharmful substances move toward the outlet end face 9b and exit to the outside through the opening at the outlet end face 9b. As understood from FIG. 1, since the inlet and outlet sides have a symmetrical shape, the inlet and outlet sides are distinguished for convenience of description and do not indicate absolute filter positions. For example, although described as the inlet side in the filter manufacturing process, it may be used as the outlet side in the filter mounting and use process, and vice versa.

Figure 3:
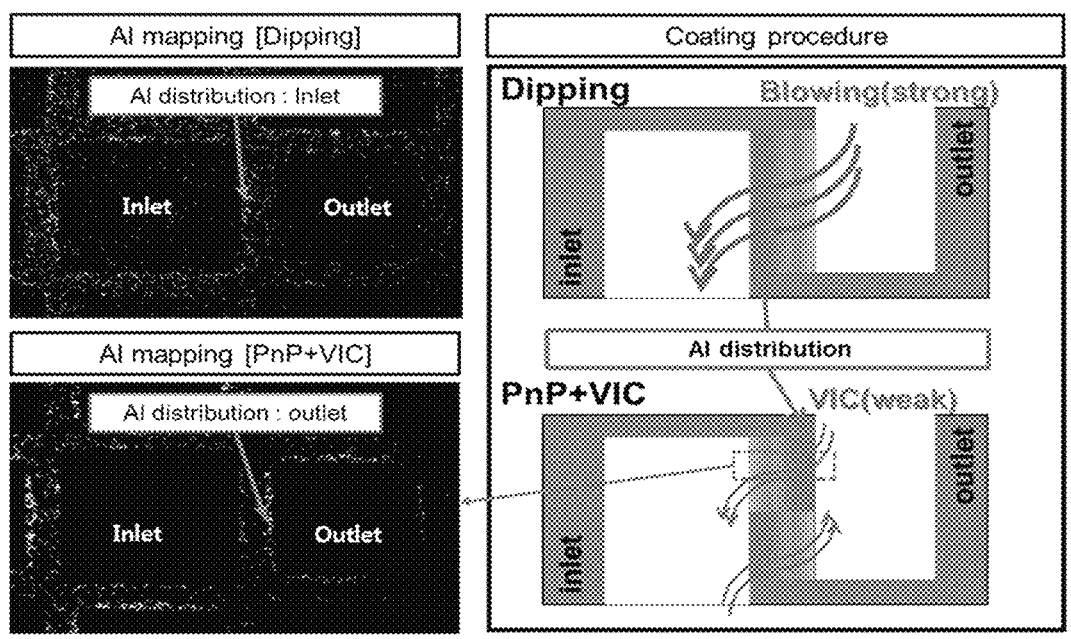
FIG. 3 shows the distributions of slurry inside a cell wall in the cases where the slurry is coated by a dipping method (upper figure) and a PnP method (lower figure), respectively, which are exemplary coating methods of various conventional coating methods. The slurry is uniformly distributed on one side of the cell wall when the slurry is coated by the dipping method. However, referring to the lower figure of FIG. 3, when the slurry is coated using the PnP coating method, the shape of a lower portion of the coating is different from the shape of an upper portion of the coating because in the PnP coating method, the lower portion of the cell wall of the filter is primarily partially coated (preferably about 20% to 80% of the total area is coated by primary coating), the filter is turned over, and the remaining portion (i.e., upper portion) of the cell wall is secondarily coated. For this reason, the filter has a non-uniform slurry distribution such that the shape of the coating at the upper portion of the cell wall differs from the shape of the coating at the lower portion of the cell wall.
Figure 6:
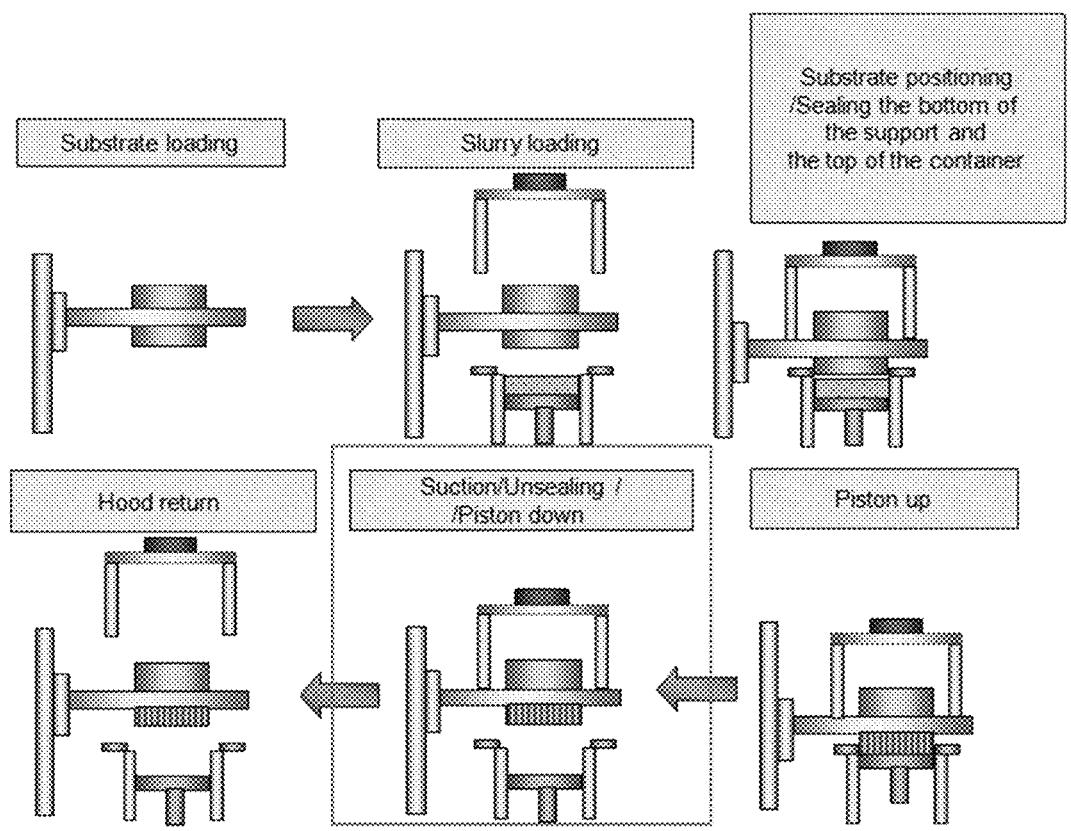
FIG. 6 is a schematic flowchart showing a method of applying the coating method according to the PnP method to a filter.

A dipping method is most common among various coating methods for coating the cell wall surface 13 or coating the inside of the pores. Referring to FIG. 3 (top side), a slurry is prepared from catalytic particles, and a filter is dipped in the slurry so that the cell walls of the filter are coated with the slurry. In the process, excess slurry is removed by blowing air in a direction opposite to the slurry inflow direction. The inventors of the present application confirmed that the catalyst material supported on one side of the cell wall could be moved by this air (indicated by Al distribution) through a scanning electron microscope (SEM) image. However, the conventional dipping method has problems in that slurry control and reproducibility of an accurate amount of slurry to meet the exhaust gas regulations and maintain catalytic activity cannot be guaranteed, and a slurry distribution in a filter cell cannot be controlled when it is required. Above all, there are cases where the dipping method cannot be used depending on the porosity of a filter. On the other hand, the so-called PnP method introduced as a method of coating a predetermined amount catalyst slurry is a coating method applicable to a catalytic converter that is structurally different from a filter. Unlike a filter, a backpressure issue needs not be considered for a converter. Therefore, there is no need to control the coating profile when coating a converter. The inventors of the present application used the PnP method, which was applied only to a conventional converter, to coat a catalyst filter. The PnP method will be briefly described with reference to FIG. 6. The PnP method includes: (a) charging a catalyst slurry into a volume-defined container having a vertically movable bottom; (b) moving an upper end of the container toward a lower end of the catalyst filter so that the upper end of the container and the lower end of the catalyst filter are leveled; (c) sealing the lower end of the catalyst filter and the upper end of the container to be isolated from the outside; (d) moving the bottom of the container upward; (e) applying a vacuum pressure; (f) releasing the sealing of the lower end of the catalyst filter and the upper end of the container so that the inside of the filter channel can be coated with the catalyst slurry. Specifically, the inside of the cell or the wall surface of the cell are coated. The operational mechanism of the coating method consisting of the steps will be described. After a predetermined amount of catalyst slurry is charged into each of a plurality of channels of the catalyst filter through steps (a) to (d), a vacuum pressure is applied (step e). Until step e, the slurry charged into in the channel does not move toward the upper end of the channel but stay at the initial level. The next step, that is, in step (f), the sealing of the lower end of the catalyst filter and the upper end of the container is released. In this step, the predetermined amount of catalyst slurry charged in the channel moves toward the upper end of the channel so that the catalyst slurry thinly coats the inner wall (i.e., cell wall) of each channel. In this step, only about half of the channel length is coated. After the half-coating, the catalyst filter is turned upside down, and steps (a) to (f) are performed to coat the remaining half of each channel of the filter. Thus, a coating layer is formed such that a slurry distribution differs between an upper half portion and a lower half portion of a cell wall. Namely, referring to FIG. 3 (bottom side) in which a lower portion of the cell wall of the filter is partially coated with the PnP method. Preferably 20% to 80% of the total channel length may be coated. Then, the filter is turned upside down to coat the remaining part of the cell wall. Through this method, a new coating form in which slurry distributions in an upper portion and a lower portion of the cell wall differ can be obtained. This profile is different from the inner coating profile of the cell wall formed by the dipping method. Specifically, in some of the cell walls of the catalyst filter, the slurry is concentrated at an outlet portion of each of the cell walls while in some of the cell walls, the slurry is concentrated at an inlet portion of each of the cell walls. Thus, a new coating profile that cannot be achieved by the dipping method can be obtained.

On the other hand, in order to expect the same effect as the slurry arrangement on one side of the cell wall that can be obtained by the dipping method, that is, to obtain the same effect as the backpressure of the catalyst prepared by the dipping method, and ultimately to control the coating profile of the catalyst material coated or supported on the filter, the filter coating was performed by the PnP method, and then an air pressure of 2.0 bar or less was applied for a short period of less than 1 second. As a result, surprisingly, the slurry arrangement in which slurry coating arranged side by side on the cell wall was achieved as in the dipping method.

Figure 4:
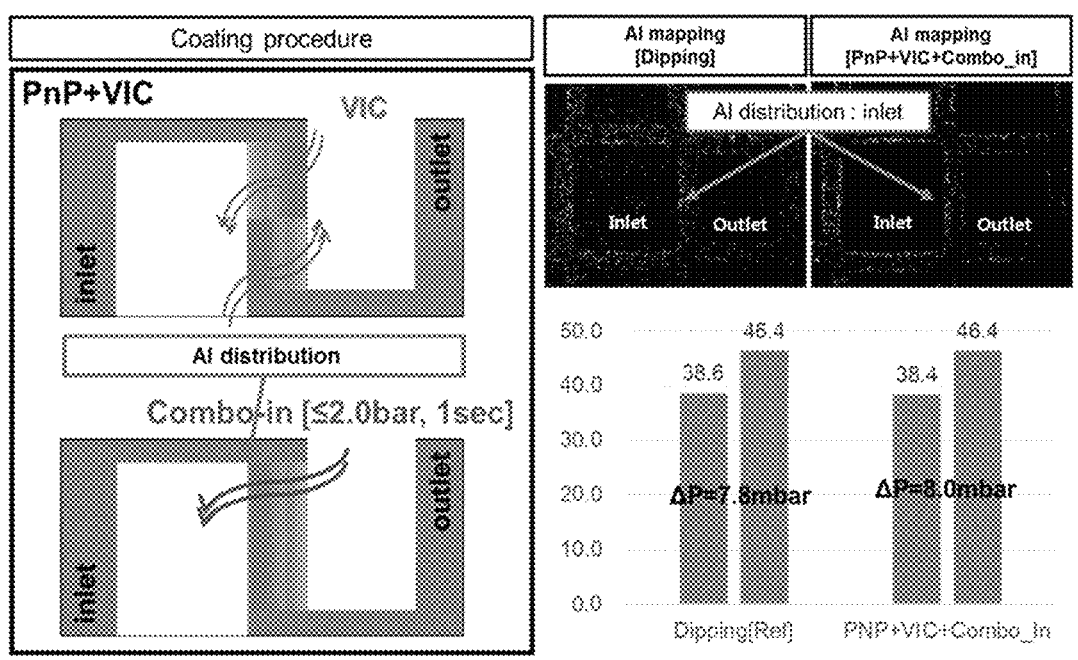
FIG. 4 shows a slurry distribution inside the wall of a filter cell in the case where a week air pressure is applied in the same direction as the slurry feed direction when the filter cell is coated with slurry by the PnP method so that the shape of the coating can have the degree of uniformity that can be obtained by the dipping method. In this case, the slurry distribution and backpressure equivalent to those achieved by the dipping method can be obtained.

FIG. 4 shows an example in which the viscosity of the slurry is adjusted (100 cP or less) so that the slurry can be introduced into the cell wall. The cell wall inner coating profile (in-wall profile) is illustrated. It is possible to change the coating profile (on-wall profile) on the cell wall surface by adjusting the viscosity (500 cP or more) and particle size (10 μm or more) so that the slurry cannot flow into the pores of the cell wall when needed.

First, referring to FIG. 4, to improve the distribution of the slurry in the pores of the cell wall according to the PnP method, when weak air pressure is applied after a predetermined amount of slurry is injected into the filter, the profile of the slurry coating in the cell wall is changed. It was confirmed that the slurry distribution and back pressure could be obtained to the extent that can be achieved by the dipping method. As the primary goal of the present invention, as illustrated in FIG. 4 (top side), the slurry is concentrated at the outlet side of the cell wall in a part (upper part) of the catalyst filter by using the PnP method. In a part (lower part) of the catalyst filter, the slurry is concentrated at the filter inlet side cell wall. The upper and lower ends of the catalyst filter shown in FIG. 4 are coated with the catalyst slurry in a manner that either one of the upper and lower ends of the catalyst filter is first coated with the slurry, the filter is then turned upside down, and then the other end of the upper and lower ends of the filter is then coated. First, the inside of the cell wall at the lower portion of the catalyst filter is coated with the slurry inflowing from the inlet side, and the filter is then turned over. Next, the filter is coated again with the slurry inflowing from the outlet side so that the remaining uncoated region of the filter can be coated. That is, the inside of the cell wall is entirely coated. However, as described above, in this filter, the slurry is concentrated at the outlet side of the cell wall in a portion of the catalyst filter, and the slurry is concentrated at the inlet side of the cell wall of the filter in the other portion. That is, the filter has an asymmetric structure. On the other hand, according to the present invention, the lower portion (FIG. 4) of the filter is coated using the PnP method, the filter is then turned over, and an air pressure as low as 2.0 bar is applied for a period of 1 second. the slurry is distributed along one side surface of the cell wall.

Figure 5:
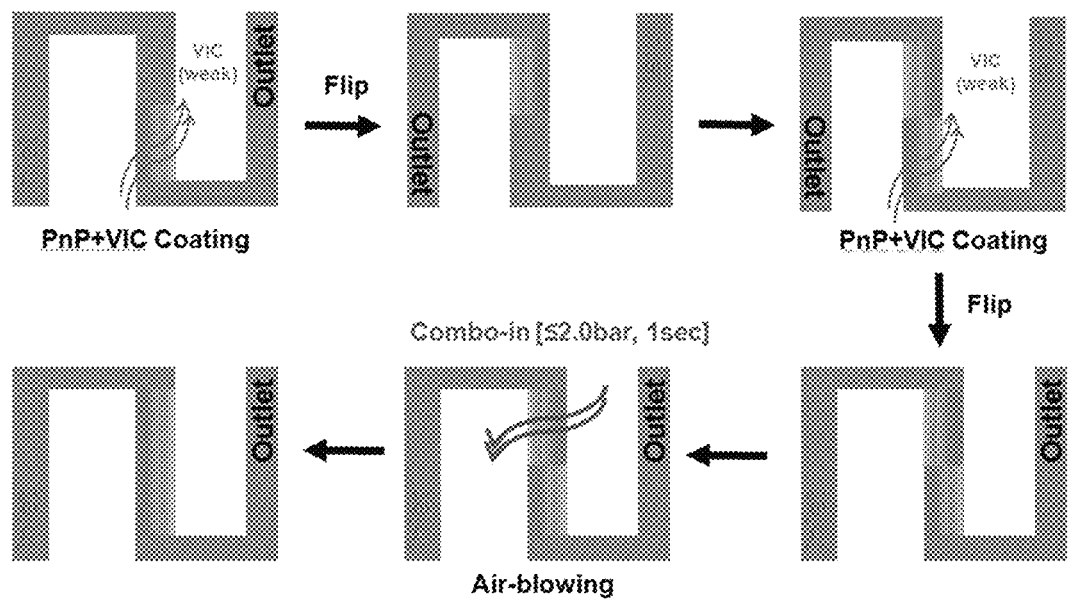
FIG. 5 shows a coating method, step by step, according to the present invention performed to achieve the slurry distribution shown in FIG. 4.

Specifically, referring to FIG. 5, the catalyst filter is half coated first. At this time, a predetermined amount of the slurry is injected from the inlet side of the filter by the PnP method. Since weak vacuum diffusion coating (VIC) is used, the slurry is concentrated on a slurry feed side portion (i.e., filter inlet side) of the cell wall. The catalyst filter is then turned over, and the remaining half of the filter is coated. That is, for coating the remaining half, a predetermined amount of slurry is injected from the filter outlet side by the PnP method and weak VIC is performed. Thus, the slurry is concentrated on a slurry feed side portion (i.e., filter outlet side) of the cell wall. As the result, a new cell wall profile shown in FIG. 4 (bottom) is obtained. Furthermore, referring to FIG. 5, the inventors of the present application confirmed that when weak air pressure as low as 2.0 bar or less was applied the filter to from the outlet side to the inlet side for a period of 1 second after the filter is turned over, the slurry distribution at the upper portion of the cell wall was changed to match the slurry distribution at the lower portion of the cell wall.

Figure 7:
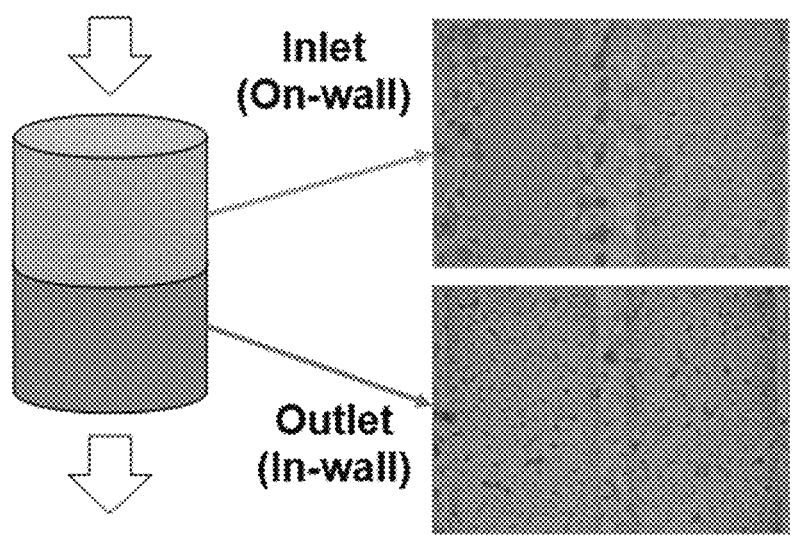
FIG. 7 is a schematic diagram illustrating a coating method in which the wall surface of a cell is coated with slurry in an upper portion of a filter whereas the inside of the wall the cell is coated with slurry in a lower portion of the filter.

On the other hand, FIG. 7 shows a method of adjusting the viscosity (500 cP or more) and particle size (10 μm or more) so that the slurry cannot enter the pores formed in the cell wall at the filter inlet side and thus the coating is formed only on the cell wall surface (referred to as on-wall coating). On the other hand, when coating the filter outlet side, the viscosity and particle size are adjusted such that the slurry can enter the pores formed in the cell wall. That is, the in-wall coating is formed at the filter outlet side.

Therefore, when using the coating method of the present invention, a predetermined amount of slurry can be introduced into the channels of a filter. Therefore, it is possible to avoid the problems caused by excess or surplus slurry injection. After the predetermined amount of slurry is introduced into the channels of the filter, only the wall surface of each of the channels is coated (i.e., on-wall coating) or both the wall surface and the pores of the wall surface are coated (on-wall coating and in-wall coating), depending on the viscosity of the slurry. In addition, since the coating profile in the cell wall is adjusted by the subsequent air blowing, the backpressure and catalyst performance such as catalytic activity of the filter can be improved. In addition, the length of the coating in the filter can also be adjusted by controlling the pressure of air during the air blowing.

The invention claimed is:

1. A method of coating an exhaust gas purification catalyst filter with a predetermined amount of a coating material, the method comprising:
   (1) injecting a predetermined amount of catalyst slurry into the exhaust gas purification catalyst filter from an inlet side of the exhaust gas purification catalyst filter comprising the steps of:
      (a) charging the catalyst slurry into a volume-defined container having a vertically movable bottom;
      (b) moving an upper end of the volume-defined container toward a lower end of the inlet side of the exhaust gas purification catalyst filter so that an upper end of the volume-defined container and the lower end of the inlet side of the exhaust gas purification catalyst filter are leveled;
      (c) sealing the lower end of the inlet side of the exhaust gas purification catalyst filter and the upper end of the volume-defined container to be isolated from an outside;
      (d) moving the vertically movable bottom of the volume-defined container upward;
      (e) applying a vacuum pressure; and
      (f) releasing the sealing of the lower end of the inlet side of the catalyst filter and the upper end of the volume-defined container so that about half of an inside of a exhaust gas purification catalyst filter channel is coated with the catalyst slurry;
   (2) turning the half-coated exhaust gas purification catalyst filter upside down and performing steps (a) to (f) from an outlet side of the exhaust gas purification catalyst filter so that the remaining half of the inside of the exhaust gas purification catalyst filter channel is coated; and
   (3) turning the exhaust gas purification catalyst filter upside down and blowing air from the outlet side to the inlet side of the exhaust gas purification catalyst filter, wherein the air is blown into the exhaust gas purification catalyst filter at a predetermined pressure for a predetermined period to adjust distribution of the catalyst slurry on a wall surface of each cell of the exhaust gas purification catalyst filter.

2. The method of claim 1, wherein the catalyst slurry has a viscosity, or comprises particles having a particle size, or both at which the catalyst slurry cannot enter pores formed in a cell wall of the exhaust gas purification catalyst filter.

3. The method of claim 1, wherein the catalyst slurry injected into the exhaust gas purification catalyst filter from the inlet side and the catalyst slurry injected into the exhaust gas purification catalyst filter from the outlet side are identical.

4. The method of claim 1, wherein the air is blown into the catalyst filter at a pressure of 2.0 bar or lower for a period of 1 second.

5. The method of claim 1, wherein the catalyst slurry has a viscosity, or comprises particles having a particle size, or both at which the catalyst slurry can enter pores formed in a cell wall of the exhaust gas purification catalyst filter.

* * * * *